US012691561B2

(12) United States Patent
Redondi

(10) Patent No.: US 12,691,561 B2
(45) Date of Patent: Jul. 28, 2026

(54) INSERT TOOL AND METHOD FOR PRODUCING AN INSERT TOOL

(71) Applicant: Robert Bosch GmbH, Stuttgart (DE)

(72) Inventor: Paolo Redondi, Brembate (IT)

(73) Assignee: Robert Bosch GmbH, Stuttgart (DE)

( * ) Notice: Subject to any disclaimer, the term of this patent is extended or adjusted under 35 U.S.C. 154(b) by 820 days.

(21) Appl. No.: 17/176,866

(22) Filed: Feb. 16, 2021

(65) Prior Publication Data

US 2021/0252686 A1 Aug. 19, 2021

(30) Foreign Application Priority Data

Feb. 19, 2020 (DE) ......................... 102020202079.5

(51) Int. Cl.
*B25D 17/02* (2006.01)

(52) U.S. Cl.
CPC .......... *B25D 17/02* (2013.01); *B25D 2222/51* (2013.01)

(58) Field of Classification Search
CPC ....................... B25D 2222/09; B25D 2222/51; B25D 17/02; B23B 51/00; B28D 1/146; B23K 10/027
USPC ............................................................ 125/40
See application file for complete search history.

(56) References Cited

U.S. PATENT DOCUMENTS

| | | | |
|---|---|---|---|
| 4,682,987 A | 7/1987 | Brady et al. | |
| 4,864,094 A | 9/1989 | Saltzman et al. | |
| 4,944,559 A * | 7/1990 | Sionnet | E21C 35/183 299/105 |
| 2006/0185908 A1 | 8/2006 | Kembaiyan et al. | |
| 2008/0054707 A1 | 3/2008 | Hall et al. | |
| 2009/0256413 A1 | 10/2009 | Majagi et al. | |
| 2015/0196991 A1 | 7/2015 | Montross | |
| 2017/0043406 A1* | 2/2017 | Waki | C23C 30/005 |
| 2022/0097220 A1 | 3/2022 | Kederer et al. | |

FOREIGN PATENT DOCUMENTS

| | | | |
|---|---|---|---|
| CN | 1218427 | A | 6/1999 |
| CN | 101048528 | A | 10/2007 |
| CN | 101652500 | A | 2/2010 |
| CN | 103388145 | A | 11/2013 |
| CN | 103506811 | A | 1/2014 |
| CN | 106232276 | A | 12/2016 |
| DE | 10 2005 048 474 | A1 | 4/2007 |
| DE | 11 2005 003 357 | T5 | 4/2008 |
| DE | 20 2011 002 916 | U1 | 6/2011 |
| DE | 10 2011 085 818 | A1 | 5/2013 |
| DE | 10 2012 224 434 | A1 | 7/2014 |
| DE | 10 2017 122 079 | A1 | 3/2018 |
| GB | 760353 | A | 10/1956 |
| RU | 2 480 974 | C1 | 5/2013 |
| WO | 2006/125234 | A1 | 11/2006 |
| WO | 2007/041995 | A1 | 4/2007 |
| WO | 2009/043617 | A1 | 4/2009 |

* cited by examiner

*Primary Examiner* — Katina N. Henson
(74) *Attorney, Agent, or Firm* — Maginot, Moore & Beck LLP

(57) ABSTRACT

An insert tool, in particular a chisel or a drill, has a tool head, with a shaft region in which a main body is arranged. The main body has a first hardness, and with a coating which has a second hardness that is greater than the first hardness. The coating has chromium carbide or consists of chromium carbide. Advantageously, the durability of the insert tool can be prolonged as a result.

20 Claims, 8 Drawing Sheets

INSERT TOOL AND METHOD FOR PRODUCING AN INSERT TOOL

This application claims priority under 35 U.S.C. § 119 to patent application no. DE 10 2020 202 079.5, filed on Feb. 19, 2020 in Germany, the disclosure of which is incorporated herein by reference in its entirety.

BACKGROUND AND SUMMARY

The present disclosure relates to an insert tool, in particular a chisel or a drill. The insert tool has a tool head, having a shaft region in which a main body is arranged, wherein the main body has a first hardness, and having a coating which has a second hardness that is greater than the first hardness. It is proposed that the coating has chromium carbide or consists of chromium carbide. Advantageously, the durability of the insert tool can be prolonged as a result. Alternatively, it is also conceivable that the coating has a hard metal which comprises a hard material and a metal matrix.

The drill can be formed, for example, as a masonry drill or as a tile drill which is provided for a hammer drill. The chisel can be formed, for example, as a flat chisel or as a pointed chisel, which are provided for a hammer drill and/or a breaker. At its end facing away from the tool head, the insert tool has an insertion end, which is designed to be coupled to a handheld power tool, such as a hammer drill. Preferably, the insert tool is formed in the region of the insertion end such that the insert tool can be coupled to a tool holder of the handheld power tool. For example, the insert tool can have formfitting elements designed as specific grooves in the region of the insertion end, which form an SDS-plus or an SDS-max interface. Alternatively, a hex interface or the formation of the insertion end as a round shaft, for example, would also be conceivable. To process a workpiece, the insert tool is set into a rotating and/or linearly oscillating or impacting state by means of the hammer drill. The insert tool penetrates into the workpiece in the feed direction of the insert tool during the processing. The feed direction of the insert tool extends coaxially to the longitudinal axis of the insert tool and in the direction of the tool head, starting from the insertion end. The longitudinal axis of the insert tool corresponds in particular to a working or rotational axis of the insert tool. In this connection, a tool head is to be understood, in particular, as a region of the insert tool which is designed to process and/or part the workpiece. The tool head preferably has at least one cutting element. The tool head can have one or more cutting elements. Each cutting element has at least one cutting edge or a cutting tip. Preferably, each cutting element has an individual cutting edge. Alternatively, the cutting element can also have multiple cutting edges, which in particular merge into one another. In particular, the region of the tool head is covered by the at least one cutting element. The main body is in particular formed from a high-speed steel or a steel suitable for hardening, such as, for example, 42CrMo4, 46CrB2, 41Cr, 34CrNiMo16 or C45, C50. The main body preferably has a hardness in the range between 48 and 56 HRC (Hardness Rockwell C).

The hard material consists in particular of tungsten carbide. The tungsten carbide can be formed, for example, as a cast tungsten carbide—CTC, consisting of an in particular eutectic mixture of $W_2C$ and WC, a spherical cast tungsten carbide—CTC-s, and/or a monocrystalline tungsten carbide—MTC. The hard material preferably has a hardness in the range between 1700 and 3100 HV0.1 (Vickers hardness test), preferably in the range between 2000 and 2300 HV0.1.

The hard material preferably consists of hard material particles which have an in particular average size in the range between 50 and 180 μm.

The metal matrix can comprise a cobalt alloy, a cobalt-chromium alloy or a nickel alloy. Alternatively, it is also conceivable that the metal matrix is based on cobalt or iron. The nickel alloy is preferably formed as an NiBiSi or an NiCrBSi alloy. Depending on the ratio between the hard material and the metal matrix, a hardness of 30 to 65 HRC is conceivable. Preferably, the weight ratio between the hard material and the metal matrix is 60% to 40%. Preferably, the hardness of the hard metal is between 50-63 HRC.

Furthermore, it is proposed that the coating is arranged on the tool head and/or in the shaft region. As a result, the durability of the insert tool can advantageously be improved further. In particular, the insert tool is covered completely by the coating in the region of the tool head and reaches into the shaft region of the insert tool. Preferably, the main body in the shaft region has a substantially cylindrical lateral surface, at least in some sections, in particular completely.

Furthermore, it is proposed that the coating has at least two coating elements, which are arranged partly or completely spaced apart from one another. Advantageously, a local reinforcement of the insert tool can be implemented as a result. In particular, the coating elements are formed as a coating track. The coating track can be continuous or interrupted.

The coating elements have a thickness which in particular is less than 50% of the diameter of the insert tool in the region of the coating, preferably is less than 25% of the diameter of the insert tool in the region of the coating, preferably is less than 15% of the diameter of the insert tool in the region of the coating. The coating element can enclose the insert tool completely in subregions. Alternatively, it is also conceivable that the coating element encloses the insert tool partially, wherein the width of the coating element is in particular less than 60% of the circumference of the insert tool in the region of the coating element, preferably less than 45% of the circumference of the insert tool in the region of the coating element, preferably less than 30% of the circumference of the insert tool in the region of the coating element. The coating elements can be applied simultaneously or successively to the insert tool, in particular the main body of the insert tool. Alternatively, it is also conceivable that the coating consists of a single coating element. In particular, the coating elements are spaced apart uniformly from one another.

In addition, it is proposed that the coating, in particular the at least one coating element, extends rectilinearly, parallel or obliquely to the longitudinal axis of the insert tool and/or spirally around the longitudinal axis of the insert tool. Advantageously, a particularly efficient and economical coating can be implemented as a result.

Furthermore, it is proposed that, in the region of the coating, an envelope curve of the coating has, at least partly, a greater radius than an envelope curve of the main body. Alternatively or additionally, it is also conceivable that, in the region of the coating, the envelope curve of the coating has, at least partly, a smaller radius than an envelope curve of the main body.

Furthermore, it is proposed that the main body has a groove, which is arranged in the shaft region and/or on the tool head. Advantageously, swarf can be transported away through the groove during drilling or the chisel can be self-sharpening. The coating is in particular arranged inside and/or outside the groove.

In addition, it is proposed that the length of the at least one coating element corresponds to between 15% and 85%, in particular between 30% and 70%, preferably between 40% and 60%, of a length of the groove. The coating elements can be arranged completely or partly inside or outside the grooves.

Furthermore, it is proposed that the tool head has a tip, wherein the coating covers the tip or is arranged at a distance from the tip. Advantageously, as a result the coating is arranged in a region in which high forces act on the insert tool. In this connection, a tip is to be understood in particular as the region of the insert tool which, at the start of the processing of the workpiece, rests on the latter. The tip can be formed as a cutting edge of the cutting element. Alternatively, the tip can also be formed as a substantially point-like tip, such as is used, for example, in pointed chisels.

Furthermore, it is proposed that the coating comprises diamond particles. Advantageously, the coating can be additionally reinforced as a result.

Furthermore, it is proposed that the coating, in particular the coating elements, have an interruption which extends along the longitudinal axis of the insert tool. Advantageously, the material of the main body of the insert tool is protected in the region of the interruption. In the region of the interruption, the insert tool is free of the coating. The interruption is arranged in particular between a start point and an end point of the coating element, wherein the length of the coating element corresponds to a maximum distance between the start point and the end point of the coating element along the longitudinal axis of the insert tool. A coating element having an interruption thus has a first part and a second part, which are located at different points along the longitudinal axis of the insert tool. It is likewise conceivable that a coating element has two or more interruptions. The length of the interruption of the coating element corresponds to at least 5%, in particular at least 10%, preferably at least 20%, preferably at least 40%, of the length of the coating element.

The disclosure also relates to a method for producing an insert tool, in particular a chisel or a drill, having a tool head, having a shaft region in which a main body is arranged, wherein the main body has a first hardness, and having a coating which has a second hardness that is greater than the first hardness. It is proposed that the coating be applied by an LMD (laser metal deposition or laser application welding) process. Advantageously, the coating can be applied in a manner protecting the material of the main body of the insert tool as a result of the LMD process. In the LMD process, a laser produces a melt bath on the surface of the insert tool, in particular the main body. At the same time, a powder can be supplied via a nozzle, melting in accordance with a desired shape. Via the nozzle, the powder is jetted onto the insert tool, in particular the main body, so that the applied material or powder can grow in any desired spatial direction. As described before, the powder can consist of a mixture of a hard material and a metal matrix.

Furthermore, it is proposed that the coating has multiple coating elements, which are produced successively via the LMD process. In particular, following the production of the first coating element and before the production of the second coating element, there is a pause. The pause can in particular lie in a range below one minute, preferably in a range below 10 seconds, preferably in the range of a few seconds. Advantageously, the material of the main body is not too rapidly and/or too intensely heated as a result. Furthermore, it is proposed that the coating elements are applied counter to or in the feed direction of the insert tool. The coating elements can be applied beside one another and/or over one another. In particular, the start point of the coating process is arranged behind a cutter of the insert tool.

Furthermore, it is proposed that the insert tool be heated before the coating process. Advantageously, the connection of the coating to the material to be coated, in particular the main body of the insert tool, can be improved as a result.

BRIEF DESCRIPTION OF THE DRAWINGS

Further advantages can be gathered from the following drawings description. The drawings, the description and the claims contain numerous features in combination. Those skilled in the art will expediently also consider the features individually and combine them to form practical further combinations. Designations of features of different embodiments of the disclosure which substantially correspond are provided with the same number and with a letter identifying the embodiment.

DETAILED DESCRIPTION

Figure 1B:
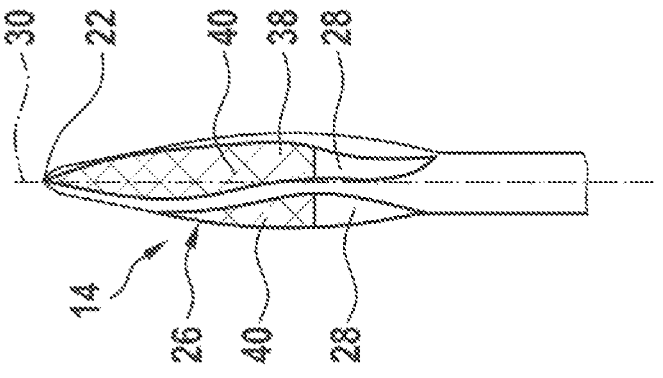
FIG. 1*b* shows the insert tool according to FIG. 1*a* with a coating.
Figure 1A:
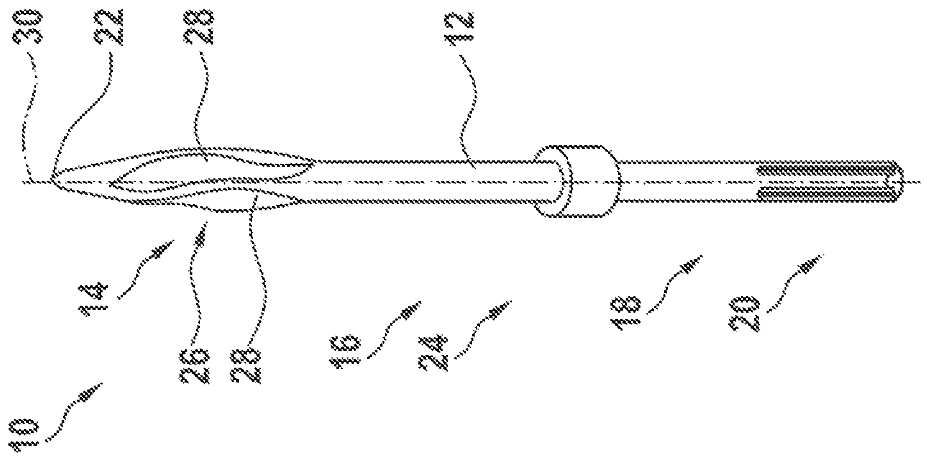
FIG. 1*a* shows a first embodiment of an insert tool in a side view without a coating.

In FIG. 1*a*, a first embodiment of an insert tool 10 is shown in an uncoated state. By way of example, the insert tool 10 is formed as a pointed chisel. The insert tool 10*a* has a main body 12. The main body 12 consists of steel, which is preferably suitable for hardening. The insert tool 10 comprises a tool head 14, which is connected via a shaft region 16 to an insertion end 18.

The main body 12 extends from the insertion end 18 as far as the tool head 14 and, by way of example, is formed in one piece. It would also be conceivable for the main body 12 to consist of multiple pieces, which in particular are connected integrally to one another. By way of example, the insertion end 18 has an SDS-plus interface 20 and is provided to connect the insert tool 10 to a tool holder of a handheld power tool, not illustrated, preferably a hammer drill or a breaker. In the region of the insertion end 18, the insert tool 10 is enclosed when connected to the handheld power tool. The tool head 14 has a tip 22, which is substantially point-like. In the region of the tool head 14, the diameter of the insert tool 10, in particular that of the main body 12, decreases substantially continuously toward the tip 22.

The shaft region 16 of the insert tool 10 has a first subregion 24 and a second subregion 26. The first subregion 24 is arranged on the end of the shaft region 16 that faces away from the tool head 14. In the first subregion 24, the shaft region 16, in particular the main body 12, is substantially cylindrical. The cross section of the insert tool 10, in particular of the main body 12, is substantially constant in the first subregion 24. The second subregion 26 is arranged on the end of the shaft region 16 that faces the tool head 14. In the second subregion 26, the insert tool 10, in particular the main body 12, has grooves 28. The grooves 28 can be produced, for example, via forging or milling of the main body 12. By way of example, the insert tool 10 comprises four grooves 28. The grooves 28 extend along the longitudinal axis 30 of the insert tool 10. The grooves 28 can extend rectilinearly along the longitudinal axis 30, as shown, or spirally along the longitudinal axis 30. Preferably, the grooves 28 wind around the longitudinal axis 30 of the insert tool 10 in a range between 30° and 120°. By way of example, the grooves 28 each wind around the longitudinal axis 30 by about 90°. Alternatively, it would also be conceivable for the grooves 28 each to wind around the longitudinal axis 30 by more than 360°. The grooves 28 each begin at the same height in the second subregion 26 of the shaft region 16 and end at the same height in the region of the tool head 14.

Between two grooves 28 running beside each other there is arranged a land 32. The land 32 has a width 34 (see FIG. 1*c*) which is smaller than a width 36 of the grooves 28. The lands 32 follow the course of the grooves 28 and thus likewise extends spirally around the longitudinal axis 30.

In FIG. 1*b*, the insert tool 10 is shown in a coated state, wherein the insert tool 10 has a coating 38. The coating 38 has four coating elements 40. The coating elements 40 are each arranged in a groove 28. The coating elements 40, starting from the center of the grooves 28, extend toward the tool head 14, in particular to the tip 22 of the tool head 14. Alternatively, it would also be conceivable for the coating elements 40 to extend substantially in the region between the tip 22 and the grooves 28 and thus not reach or reach only insignificantly into the grooves 28.

The coating 38 or the coating elements 40 are applied via a laser metal deposition (LMD) process, in particular to an outer surface of the main body 12. The coating consists of a hard metal, which comprises a hard material and a metal matrix. By way of example, the hard material is formed as tungsten carbide and the metal matrix as NiBiSi, wherein the ratio is 60% by weight of hard material to 40% by weight of metal matrix. Advantageously, as a result it is possible to produce a coating 38 of which the hardness is greater than a hardness of the main body 12 of the insert tool 10. By means of the LMD process, the application of another hard metal as previously described is analogously conceivable. It is important to the disclosure that the hardness of the coating is greater than the hardness of the main body. If not otherwise described, the same coating is used by way of example in the following exemplary embodiments.

The size of the coating elements 40 is chosen in such a way that the coating 38 is produced via multiple individual method steps, in each of which a coating element 40 is applied. Advantageously, as a result the heating of the main body 12 during the LMD is reduced, in order to protect said main body. Following the application of a first coating element 40, the insert tool 10 is first rotated through 180° in order to apply a further coating element 40 to the opposite side. Then, for the third coating element 40, the insert tool is rotated by 90°, and rotated again by 180° for the fourth coating element 40. To implement a uniform coating without excessive heating of the insert tool 10, a period for the production of a coating element 40 is chosen in a range between 0 s and 10 s, preferably in a range between 1 and 3 s. Between the individual application steps or applications of individual coating elements 40, a pause step is carried out, in which the material can cool down. The pause step following the application of the first coating element can be carried out for a shorter time than the following pause steps. The duration of the pause steps lies in particular in a range below 1 min, preferably in a range between 10 s and 30 s.

In the region of the tool head 14, in particular in the region of the tip 22, the coating elements 40 merge into one another. Following the application of the coating 38, the tool head 14, in particular the tip 22, can be ground via a grinding method, in order to increase the removal performance of the insert tool 10.

Figure 1C:
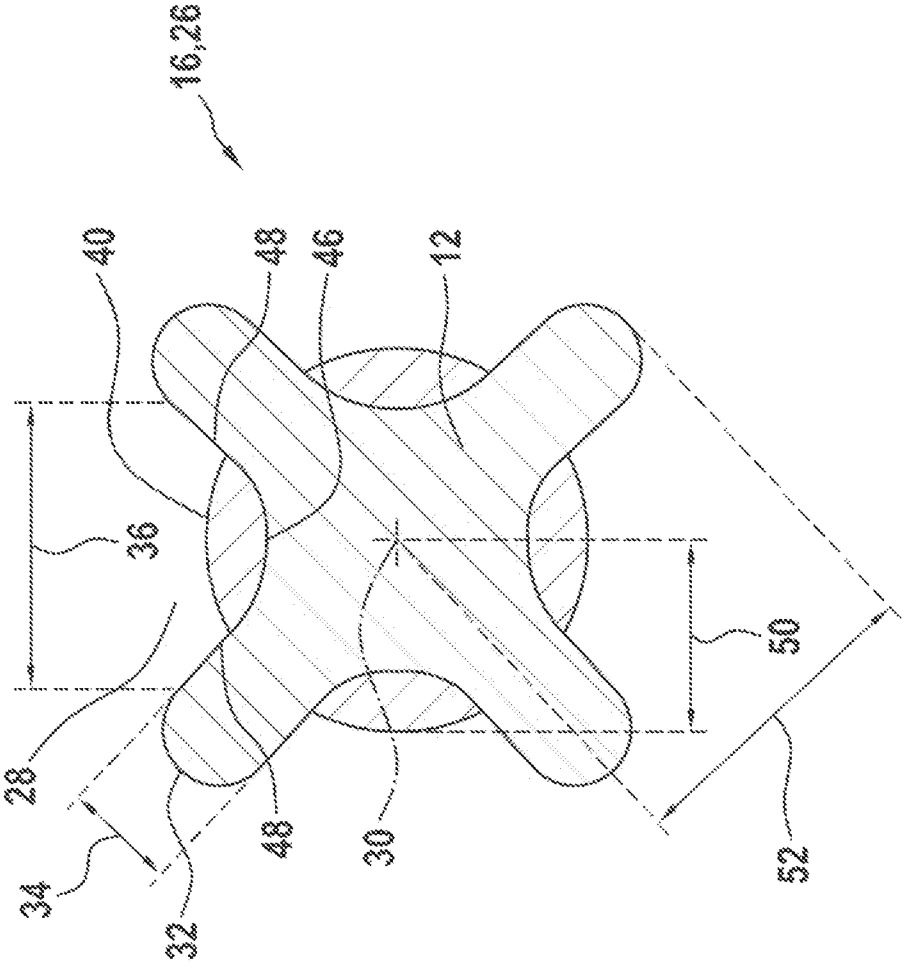
FIG. 1*c* shows a cross section of the insert tool in the shaft region.

In FIG. 1*c*, a cross section of the insert tool 10 in the second subregion 26 of the shaft region 16 is shown. The coating elements 40 are each arranged in a groove 28, in particular in a groove base 46 of the grooves 28. Alternatively or additionally, it would likewise be conceivable for the coating elements 40 to be at least partly arranged on one of the flanks 48 of the grooves 28. A maximum spacing 50 of the coating 38 from the longitudinal axis 30 is chosen to be smaller than a maximum spacing 52 of the land 32 from the longitudinal axis 30. As a result, the coating 38 is arranged completely in a space spanned by the lands 32.

Alternatively, it is also conceivable for multiple coating elements 40 to be arranged in each groove 28. By way of example, two coating elements can be arranged beside each other or three or more coating elements can also be arranged partly over one another. As a result, the individual coating elements can advantageously be smaller, which means that a shorter time is needed for each application of a coating element and, as a result, lower heating of the main body 12 is developed.

Figure 2B:
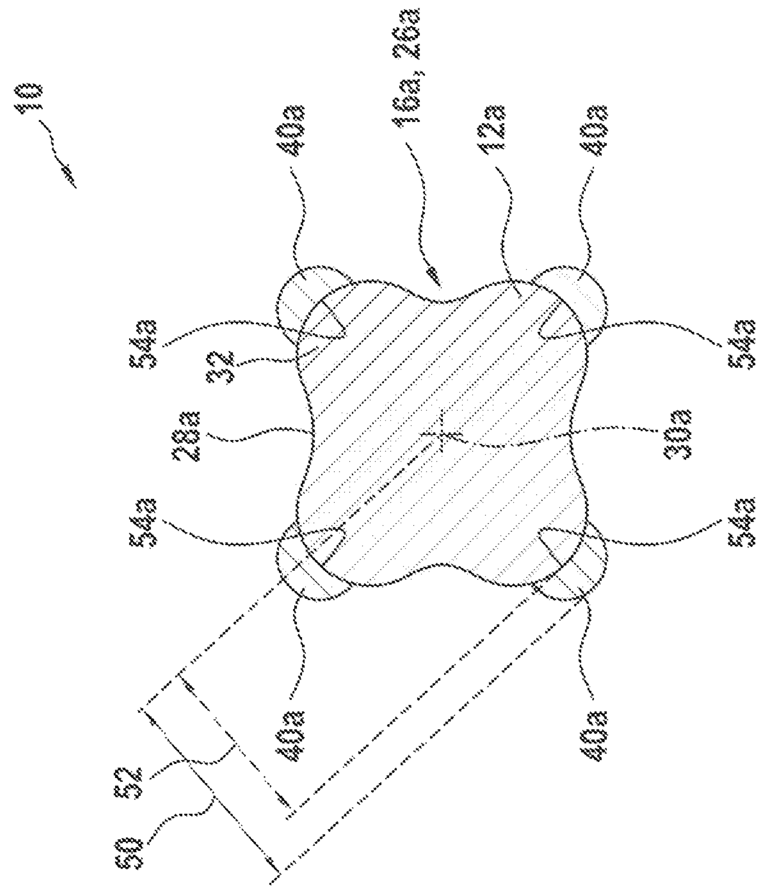
FIG. 2*b* shows a cross section of the insert tool according to FIG. 2*a* in the shaft region.
Figure 2A:
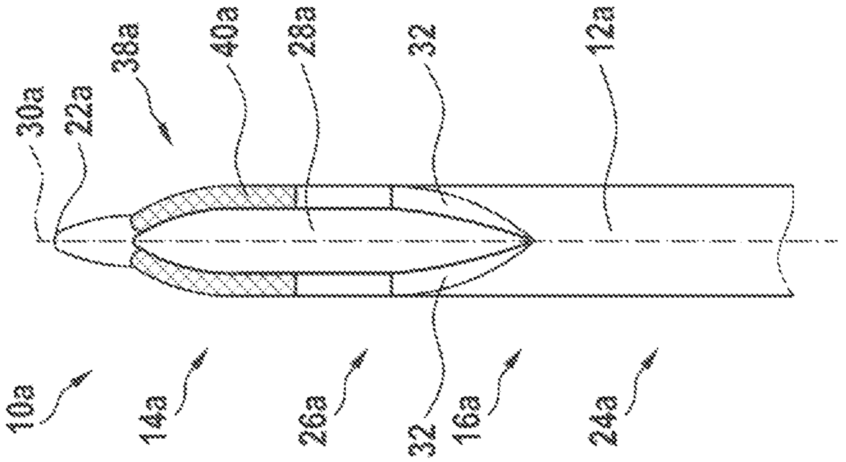
FIG. 2*a* shows a further embodiment of an insert tool with a coating.

In FIGS. 2*a* and 2*b*, an alternative embodiment of the insert tool 10 is shown. As described previously, the insert tool 10*a* is formed as a pointed chisel and has a main body 12*a* with a tool head 14*a* having a tip 22*a*, a shaft region 16*a* and an insertion end (not illustrated). The shaft region 16*a* has a first cylindrical subregion 24*a* and a second subregion 26*a*, which comprises four grooves 28*a*. As opposed to the previous exemplary embodiment, the grooves 28*a* extend substantially rectilinearly along the longitudinal axis 30*a* of the insert tool 10*a*. The coating 38*a* of the insert tool 10*a* comprises four coating elements 40*a*, which are spaced apart completely from one another. The coating elements 40*a* are each arranged on a land 32*a*. The coating elements 40*a* consist of the same hard material as the previously described coating elements 40 and are likewise applied via an LMD process. The start point of the LMD process is approximately in the center of the land 32*a*, and the end point is in the region of the tool head 14*a* at a distance from the tip 22*a*, so that the tip 22*a* is not covered with the coating 38*a*.

In FIG. 2*b*, a cross section through the second subregion 26*a* of the insert tool 10*a* is shown. The coating elements 40*a* are applied completely to the lands 32*a*, in particular to a land spine 54*a* of the lands 32*a*. In addition, it would also be conceivable for further coating elements 40*a* to be arranged in the grooves 28*a* and/or for multiple coating elements 40*a* to be arranged on a land spine 54*a*. As a result of this arrangement, the maximum spacing of the lands 32*a* from the longitudinal axis 30*a* is smaller than the maximum spacing of the coating elements 40*a* from the longitudinal axis 30*a*.

Figure 3B:
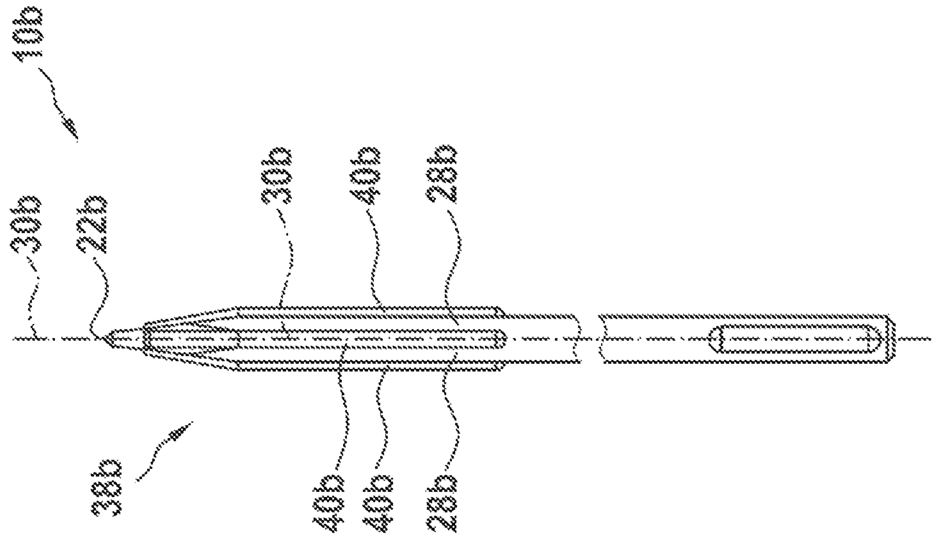
FIG. 3*b* shows the insert tool according to FIG. 3*a* with a coating.
Figure 3A:
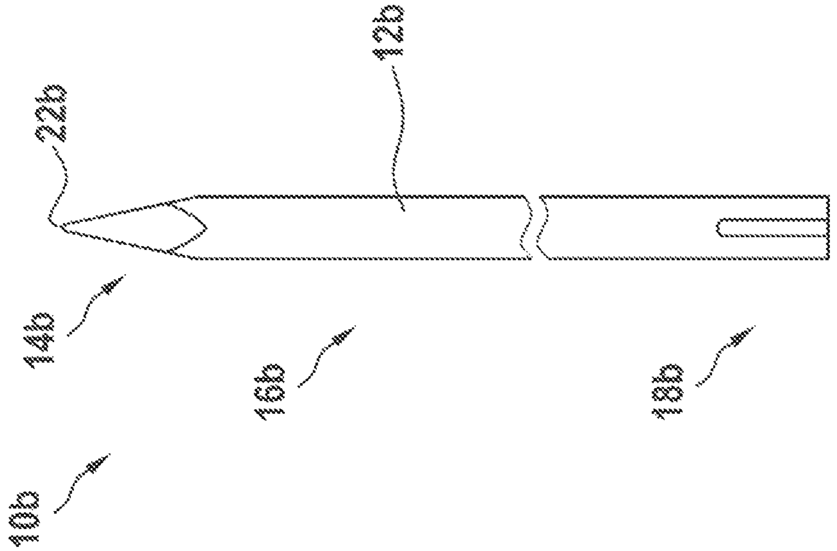
FIG. 3*a* shows a further embodiment of an insert tool without a coating.
Figure 3C:
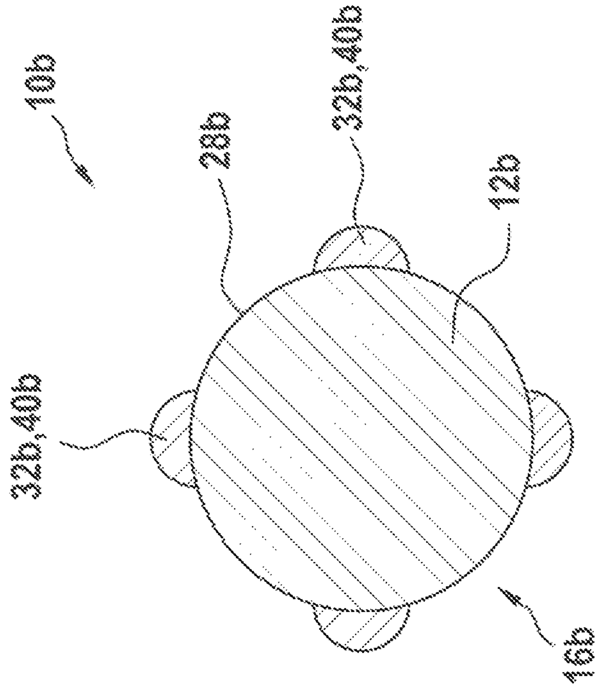
FIG. 3*c* shows a cross-section of the insert tool according to FIG. 3*b* in the shaft region.

In FIGS. 3*a* to 3*c*, a further alternative embodiment of the insert tool 10 is shown. In FIG. 3*a*, the insert tool 10*b* is shown in the uncoated state, and in the coated state in FIG. 3*b*. The insert tool 10*b* is, as previously described, formed as a pointed chisel and has a main body 12*b* with a tool head 14*b* having a tip 22*b*, a shaft region 16*b* and an insertion end 18*b*. As distinct from the preceding exemplary embodiments, the main body 12*b* has no different subregions in the shaft region 16*b* and is continuously cylindrical with a substantially constant external diameter.

The coating 38*b* has four coating elements 40*b* which, beginning in a region of the shaft region 16*a* facing the tool head 14*b* as far as the tool head 14*b*, have been applied by means of the previously described LMD process. The coating elements 40*b* extend rectilinearly and substantially parallel to one another along the longitudinal axis 30*b* of the insert tool 10*b*. The coating elements 40*b* end before the tip 22*b*, in order that the latter are not excessively heated during the LMD. In the shaft region 16*b*, the coating elements 40*b* have a substantially constant spacing from the longitudinal axis 30*b*. In the region of the tool head 14*b*, the spacing of the coating elements 40*b* to the longitudinal axis 30*b*, decreases continuously, in particular toward one another.

In FIG. 3*c*, a cross section through the insert tool 10*b* in the shaft region 16*b* is shown. The coating elements 40*b* form lands 32*b*, between which a groove 28*b* is arranged. As a result, grooves 28*b* and lands 32*b*, which prolong the service life of the insert tool 10*b*, can advantageously be produced by the coating elements 40*b*.

Figure 4:
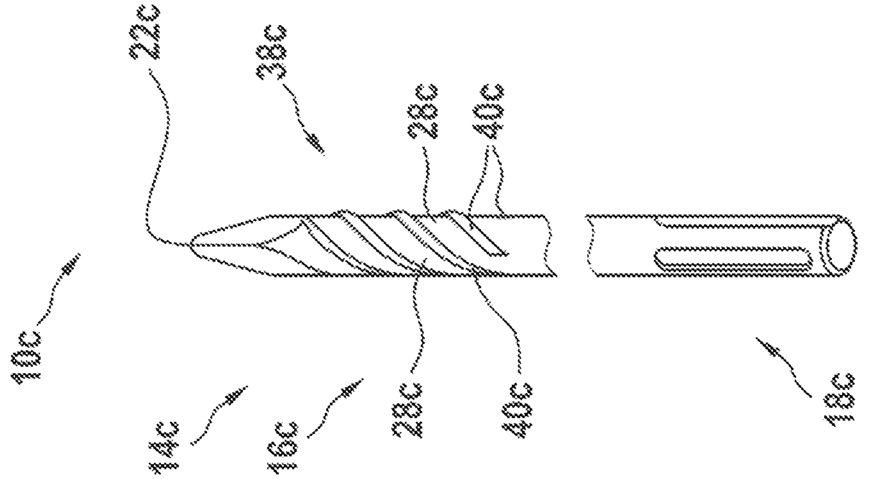
FIG. 4 shows a further embodiment of an insert tool with a coating.

In FIG. 4, an alternative embodiment of the insert tool 10*b* is shown. As previously described, the insert tool 10*c* is formed as a pointed chisel and has a main body 12*c* with a tool head 14*c* having a tip 22*c*, a shaft region 16*c* and an insertion end 18*c*. The main body 12*c* itself has no grooves. The coating 38*c* has four coating elements 40*c*, which extend spirally around the longitudinal axis 30*c* of the insert tool 10*c*. By way of example, the coating elements 40*c* have a pitch such that they each wind once around the longitudinal axis 30*c*. The coating 38*c* and the coating elements 40*c* have been applied at a distance from one another by means of the LMD process. By way of example, the coating 38*c* is applied to the end of the shaft region 16*c* facing the tool head 14*c* and does not project into the tool head 14*c*. By means of the coating elements 40*c*, grooves 28*c* are formed in the interspaces.

Figure 5B:
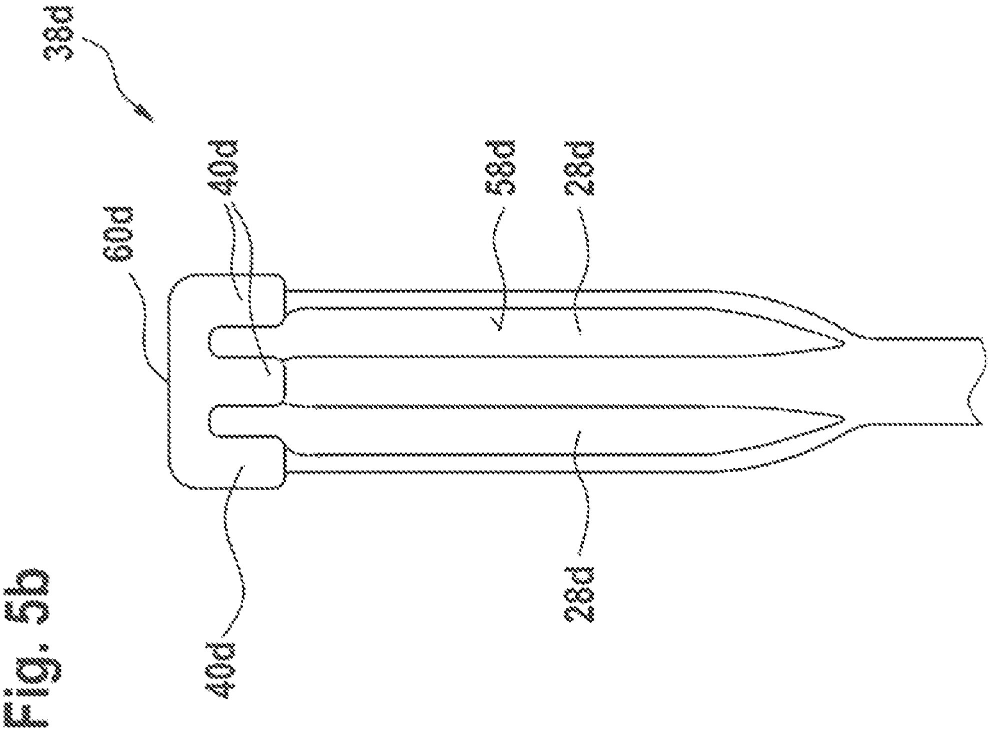
FIG. 5*b* shows the insert tool according to FIG. 5*a* with a coating.
Figure 5A:
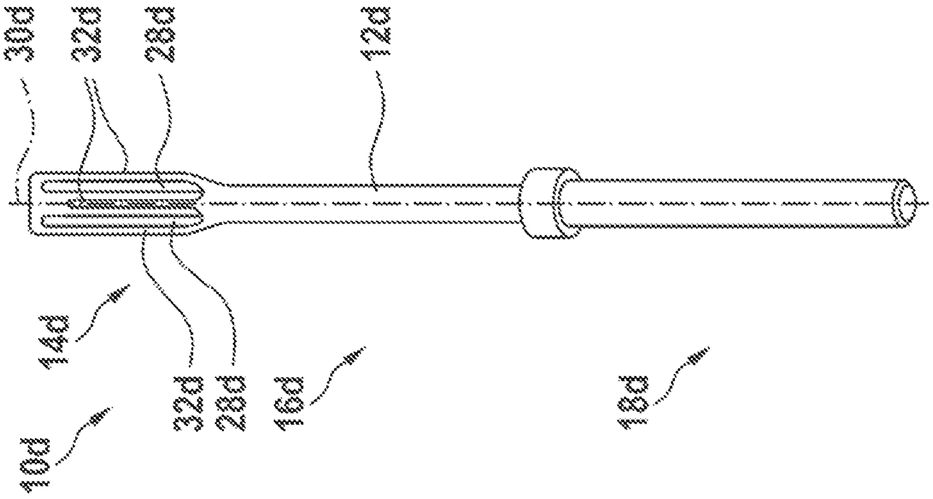
FIG. 5*a* shows a further embodiment of an insert tool without a coating.

In FIG. 5, a further alternative embodiment of the insert tool 10 is shown. The insert tool 10*d* is formed as a flat chisel and has a main body 12*d* with a tool head 14*d*, a shaft region 16*d* and an insertion end 18*d*. The shaft region 16*d* has a cylindrical cross section with a substantially constant external diameter. In the region of the tool head 14*d*, the external diameter of the main body 12*d* is enlarged. The tool head 14*d* has two side surfaces 58*d* substantially parallel to each other and a tip 22*d*, which is formed as a cutting edge 60*d*. The cutting edge 60*d* extends at right angles to the longitudinal axis 30*d* of the insert tool 10*d*. Furthermore, the insert tool 10*d*, in particular the main body 12*d*, has four grooves 28*d*. The grooves 28*d* are arranged on the tool head 14*d* and at a distance from the shaft region 16*d*. In particular, in each case two grooves 28*d* are arranged on one of the side surfaces 58*d*. The grooves 28*d* extend parallel to the longitudinal axis 30*d* of the insert tool. Between the grooves 28*d* and at the edge of the side surfaces 58*d*, there are formed lands 32*d*, which extend rectilinearly and parallel to the grooves 28*d*.

The coating 38*d* is applied to the main body 12*d* via an LMD process, as described previously, and, by way of example, has multiple coating elements 40*d*, which are applied in separate method steps. The coating 38*d* is arranged at the end of the tool head 14*d* that faces the tip 22*d*. In particular, the coating 38*d* has six coating elements 40*d*, which are each arranged on a land 32*d* and project into the tip 22*d*. Preferably, the coating elements 40*d* merge into one another in the region of the tip 22*d*, so that the tip 22*d* or the cutting edge 60*d* is covered substantially complete by the coating 38*d*.

Figure 6B:
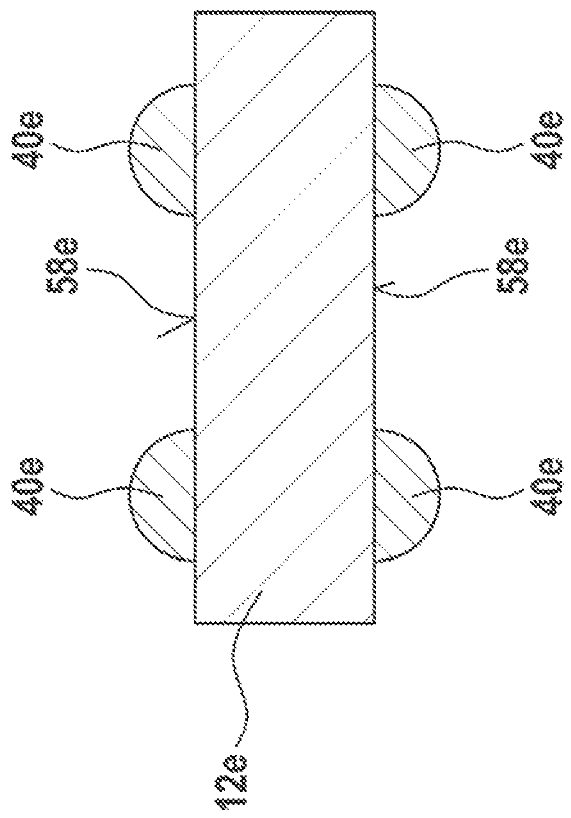
FIG. 6*b* shows a cross section through the insert tool according to FIG. 6*a* in the region of the tool head.
Figure 6A:
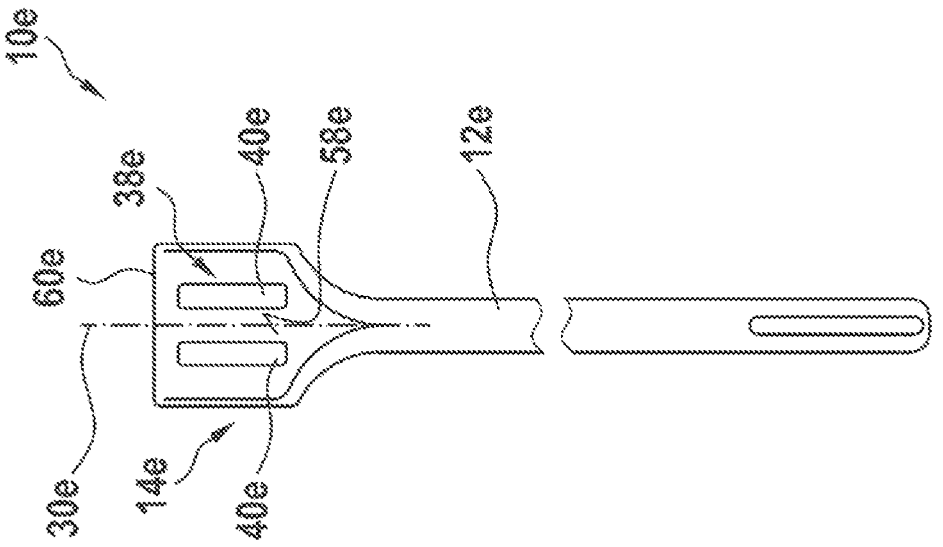
FIG. 6*a* shows a further embodiment of an insert tool with a coating.

In FIG. 6*a*, a further embodiment of the insert tool 10*d* formed as a flat chisel is shown. As described previously, the tool head 14*e* has a tip 22*e* formed as a cutting edge 60*e* and two side surfaces 58*e* parallel to each other, which are completely planar. The coating 38*e* consists of four coating elements 40*e*, wherein in each case two coating elements 40*e* are arranged on one of the two side surfaces 58*e*. The coating elements 40*e* extend rectilinearly and parallel to the longitudinal axis 30*e* of the insert tool 10*e*. In FIG. 6*b*, a cross section through the insert tool 10*e* in the region of the tool head 14*e* is shown. The coating elements 40*e* on the different side surfaces 58*e* are arranged opposite one another. However, it is also conceivable for the coating elements 40*e* to be arranged offset from one another on the different side surfaces 58*e*. Furthermore, it is conceivable that only one coating element 40*e* or three or more coating elements 40*e* are provided for each side surface 58*e*. In addition, it is likewise conceivable that a different number of coating elements 40*e* is arranged on the side surfaces 58*e* or that no coating element 40*e* is arranged on one of the side surfaces 58*e*.

Figure 7:
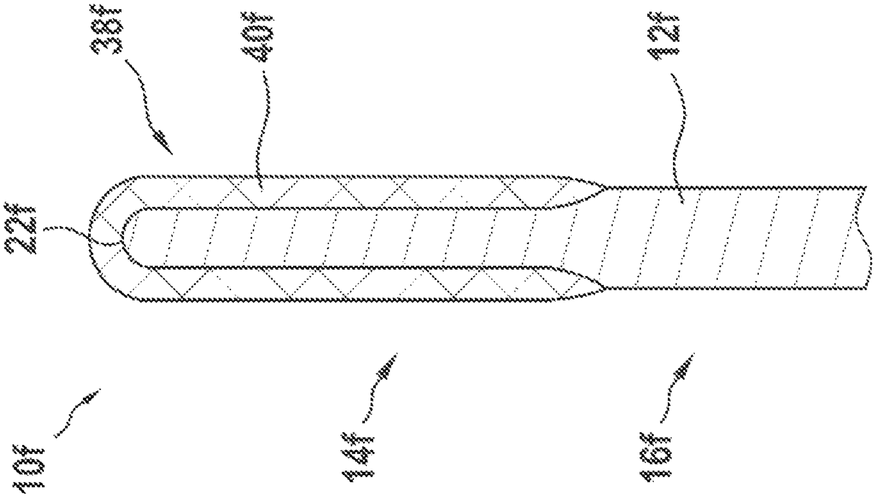
FIG. 7 shows a further embodiment of an insert tool with a coating.

In FIG. 7, a further embodiment of an insert tool 10*f* with a coating 38*f* is shown. The insert tool 10*f* has a main body 12*f* with a tool head 14*f* and a shaft region 16*f*. The insert tool 10*f* is formed as a chisel. In the shaft region 16*f*, the main body 12*f* has a cylindrical cross-section with a substantially constant external diameter. In the region of the tool head 14*f*, the main body 12*f* likewise has a cylindrical cross-section with a substantially constant external diameter, wherein the external diameter of the main body 12*f* in the region of the tool head 14*f* is smaller than in the shaft region 16*f*. In the region of the tool head 14*f*, the main body 12*f* is rounded off toward the tip 22*f*.

The coating 38*f* has a multiplicity of coating elements 40*f*, which are applied by means of an LMD process in such a way that complete coating of the main body 12*f* in the region of the tool head 14*f* is achieved. The thickness of the coating 38*f* is chosen in such a way that it corresponds substantially to the difference of the external diameter of the shaft region 16*f* from the tool head 14*f*. To increase the removal performance of the chisel, the insert tool 10*f* can be machined by means of a grinding method after the application of the coating 38*f*.

Figure 8:
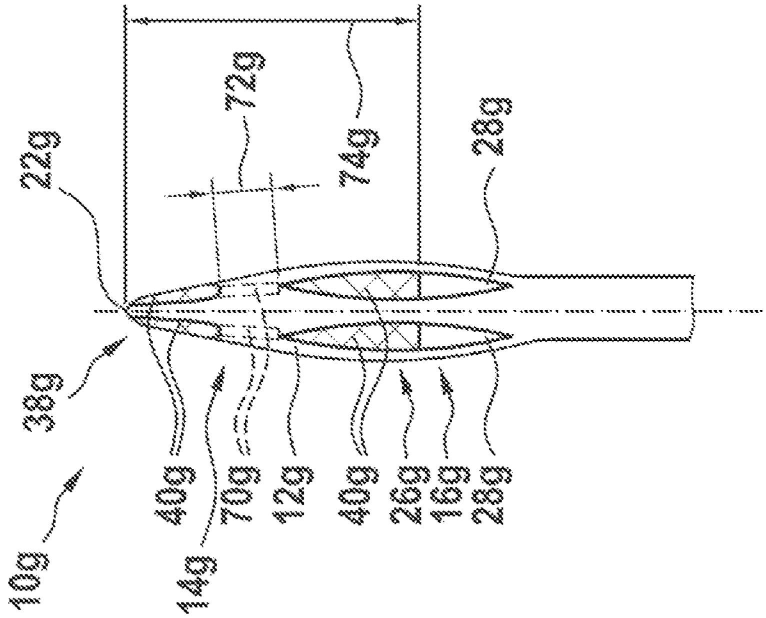
FIG. 8 shows a further embodiment of an insert tool with a coating.

In FIG. 8, a further alternative embodiment of the insert tool 10 is shown. As described previously, the insert tool 10*g* is formed as a pointed chisel and has a main body 12*g* with a tool head 14*g* having a tip 22*g*, a shaft region 16*g* and an insertion end (not illustrated). The shaft region 16*g* has a first cylindrical subregion (not illustrated) and a second subregion 26*g*, which comprises four grooves 28*g*. The grooves 28*g* are, by way of example, rectilinear.

The coating 38*g* was applied by means of an LMD process and consists of chromium carbide, for example, in this exemplary embodiment. By way of example, the coating 38*g* comprises one coating element 40*g* per groove 28*g*. The coating elements 40*g* extend substantially rectilinearly from the tip 22*g* of the insert tool 10 into the grooves 28*g*. All the coating elements 40*g* have an interruption 70*g*. The interruptions 70*g*, viewed axially, that is to say along the longitudinal axis 30*g*, have substantially the same length 72*g*. The length 72*g* of the interruption 70*g* corresponds to at least 5%, preferably at least 10%, preferably at least 25%, of a length 74*g* of the coating element 40*g*. By way of example, the length 72*g* of the interruption 70*g* is about 20% of the length 74*g* of the coating element 40*g*. In the region of the interruptions 70*g*, the insert tool 10*g*, viewed in the circumferential direction, has no coating 38*g*. As a result, in the region of the interruption 70*g*, the main body 12*g* of the insert tool 10*g* is advantageously not concomitantly heated by the LMD process. Advantageously, a start and end point of the interruptions 70*g* is arranged in such a way that it corresponds substantially to a start and end point of the grooves 28*g*.

What is claimed is:

1. An insert tool, comprising:

a main body having a tool head and a shaft region, the main body having a first hardness; and a coating which has a second hardness that is greater than the first hardness, wherein the coating has chromium carbide or consists of chromium carbide, wherein the main body defines at least one groove, each of which is arranged in at least one of the shaft region and the tool head, and wherein each groove has a groove base, and the coating includes at least one coating element, each coating element of the at least one coating element being formed as a coating track that coats the groove base of a respective groove of the at least one groove and is arranged completely inside the respective groove.

2. The insert tool according to claim 1, wherein the main body in the shaft region has a cylindrical lateral surface, at least in some sections.

3. The insert tool according to claim 1, wherein a length of each of the at least one coating elements corresponds to between 15% and 85% of a length of the respective groove.

4. The insert tool according to claim 3, wherein the length of the at least one coating element corresponds to between 40% and 60% of a length of the groove.

5. The insert tool according to claim 1, wherein the at least one coating element includes a plurality of coating elements extending along a longitudinal axis of the insert tool, each of the plurality of coating elements including a first part and a second part separated from one another in a direction along the longitudinal direction by an interruption that extends along the longitudinal axis of the insert tool.

6. A method for producing an insert tool, having a tool head, having a shaft region in which a main body is arranged, the main body having a first hardness, the method comprising:

applying a coating which has a second hardness that is greater than the first hardness to a groove base of a groove that is arranged in at least one of the shaft region and the tool head via an LMD process, the coating comprising or consisting of chromium carbide.

7. The method for producing an insert tool according to claim 6, wherein the applying of the coating includes applying multiple coating elements successively via the LMD process.

8. The method for producing an insert tool according to claim 7, wherein the applying of the multiple coating elements includes applying the multiple coating elements counter to a feed direction of the insert tool, starting from a start point that is arranged behind a tip of the insert tool.

9. The method for producing an insert tool according to claim 6, further comprising:

heating the insert tool before the applying of the coating.

10. An insert tool comprising:

a main body having a tool head and a shaft region, the main body having a first hardness; and a coating which has a second hardness that is greater than the first hardness, wherein the coating has chromium carbide or consists of chromium carbide, and wherein the tool head includes a tip of the insert tool, and the coating is spaced apart axially from the tip such that the tip is not covered with the coating.

11. The insert tool according to claim 10, wherein the coating is arranged on at least one of the tool head and the shaft region.

12. The insert tool according to claim 10, wherein the coating has at least two coating elements which are spaced apart completely from one another.

13. The insert tool according to claim 12, wherein the at least two coating elements are spaced apart uniformly from one another.

14. The insert tool according to claim 12, wherein each of the at least two coating elements is formed as a coating track.

15. The insert tool according to claim 14, wherein the insert tool includes a plurality of radially outwardly projecting lands, each of which is separated from adjacent ones of the plurality of projecting lands by a groove, and each of the at least two coating elements is arranged projecting radially outwardly from a corresponding one of the plurality of radially outwardly projecting lands.

16. The insert tool according to claim 14, wherein the shaft region is completely cylindrical, and the at least two coating elements project radially outwardly from the shaft region.

17. The insert tool according to claim 16, wherein each of the at least two coating elements extends, at least partially, rectilinearly parallel to a longitudinal axis of the insert tool.

18. The insert tool according to claim 16, wherein each of the at least two coating elements extends spirally around the main body, and each of the at least two coating elements has a pitch configured such that each of the at least two coating elements extends once around a longitudinal axis of the insert tool.

19. The insert tool according to claim 10, wherein at least a portion of the coating extends rectilinearly and parallel to a longitudinal axis of the insert tool.

20. The insert tool according to claim 10, wherein, in the region of the coating, an envelope curve of the coating has, at least partly, a greater outer radius than an envelope curve of the main body.

* * * * *